(12) United States Patent
Boffa et al.

(10) Patent No.: US 10,837,868 B2
(45) Date of Patent: Nov. 17, 2020

(54) METHOD FOR SETTING UP A TYRE CHECKING APPARATUS, SETUP DEVICE USED IN SAID METHOD

(71) Applicant: Pirelli Tyre S.p.A., Milan (IT)

(72) Inventors: Vincenzo Boffa, Milan (IT); Maurizio Marchini, Seregno (IT); Fabio Regoli, Milan (IT); Stefano Boracco, Milan (IT); Marco Cantu', Milan (IT); Valeriano Ballardini, Imola (IT); Stefano Monti, Imola (IT)

(73) Assignee: PIRELLI TYRE S.p.A., Milan (IT)

( * ) Notice: Subject to any disclaimer, the term of this patent is extended or adjusted under 35 U.S.C. 154(b) by 148 days.

(21) Appl. No.: 16/064,867

(22) PCT Filed: Dec. 22, 2016

(86) PCT No.: PCT/IB2016/057921
§ 371 (c)(1),
(2) Date: Dec. 19, 2018

(87) PCT Pub. No.: WO2017/115239
PCT Pub. Date: Jul. 6, 2017

(65) Prior Publication Data
US 2018/0372591 A1 Dec. 27, 2018

(30) Foreign Application Priority Data
Dec. 28, 2015 (IT) .................. 102015000088039

(51) Int. Cl.
*G01M 17/02* (2006.01)
*G01M 11/02* (2006.01)
(Continued)

(52) U.S. Cl.
CPC .......... *G01M 17/027* (2013.01); *G01B 11/25* (2013.01); *G01B 21/042* (2013.01); *G01M 11/0264* (2013.01)

(58) Field of Classification Search
CPC .......... G06T 7/0004; G06T 7/70; G06T 7/74; G06T 7/80; G06T 2207/30244;
(Continued)

(56) References Cited

U.S. PATENT DOCUMENTS 5,506,683 A * 4/1996 Yang et al. ........ G01B 11/2504
356/606
7,177,740 B1 2/2007 Guangjun et al. .............. 701/34
(Continued)

FOREIGN PATENT DOCUMENTS

| CN | 102478527 A | 5/2012 | ............. G01N 21/89 |
| EP | 1 120 640 A1 | 8/2001 | ............. G01M 17/02 |

(Continued)

OTHER PUBLICATIONS

International Search Report from the European Patent Office in corresponding International Application No. PCT/IB2016/057921 dated Mar. 30, 2017.
(Continued)

*Primary Examiner* — Andrew W Johns
(74) *Attorney, Agent, or Firm* — Finnegan, Henderson, Farabow, Garrett & Dunner, L.L.P.

(57) ABSTRACT

Method for setting up a tyre checking apparatus, said apparatus (1) comprising at least: a support base (34) for a tyre (2) a first acquisition device (430) and a second acquisition device (43a) for acquiring images representative of said tyre (2) positioned on said support base (34); a first robotic member (40a) for moving said second acquisition device (43a). Said method comprises: providing a setup (Continued)

device (100) comprising: a first wall (110) having first predefined shapes (F1); a second wall (120) having second predefined shapes (F2), said second wall (120) being substantially parallel and non-coplanar to said first wall (110); a top surface (130); a central reference (140) arranged on said top surface (130). Said method also comprises: executing at least one of a first set-up and a second set-up. Said first set-up sets the first acquisition device (430), and comprises: positioning said setup device (100) on said support base (34) in a first position (PI); carrying out a first group of movements relative to said setup device (100); executing a calibration of said first acquisition device (430) as a function of said first predefined shapes (F1) and second predefined shapes (F2). Said second set-up sets said first robotic member (40a) that moves said second acquisition device (43a) and comprises: positioning said setup device (100) on said support base (34) in a second position (P2); carrying out a second group of movements relative to said setup device (100); executing a configuration of said first robotic member (40a) as a function of positions taken by said central reference (140). The invention also describes a setup device (100) adapted for being used in said method.

15 Claims, 9 Drawing Sheets

(51) Int. Cl.
  *G01B 21/04* (2006.01)
  *G01B 11/25* (2006.01)

(58) Field of Classification Search
  CPC ............. G01B 11/2504; G01B 21/042; G01M 11/0264; G01M 17/027
  See application file for complete search history.

(56) References Cited

U.S. PATENT DOCUMENTS

| | | |
|---|---|---|
| 2009/0161122 A1 | 6/2009 | Boyer et al. ................... 356/620 |
| 2012/0134656 A1 | 5/2012 | Mizukusa et al. .............. 396/19 |
| 2014/0180620 A1 | 6/2014 | Hicks ................... G01B 11/005 |
| 2016/0238488 A1 | 8/2016 | Charlat et al. ...... G01M 17/027 |

FOREIGN PATENT DOCUMENTS

| | | | | |
|---|---|---|---|---|
| JP | 2009-262757 A | 11/2009 | ............. | B60C 23/06 |
| WO | WO 2014/020485 A1 | 2/2014 | ............ | G01M 17/02 |
| WO | WO 2015/004587 A1 | 1/2015 | ............ | G01M 17/02 |
| WO | WO 2015/044196 A1 | 4/2015 | ........... | G01N 21/954 |
| WO | WO 2015/079370 A1 | 6/2015 | ............ | G01M 17/02 |

OTHER PUBLICATIONS

Written Opinion of the International Searching Authority from the European Patent Office in corresponding International Application No. PCT/IB2016/057921 dated Mar. 30, 2017.
Notification of the First Office Action from the China National Intellectual Property Administration in counterpart Chinese Application No. 201680078567.8, dated Oct. 31, 2019.
Office Action issued from the Brazilian Patent Office in counterpart Application No. BR112018012511.3 dated May 28, 2020.

\* cited by examiner

METHOD FOR SETTING UP A TYRE CHECKING APPARATUS, SETUP DEVICE USED IN SAID METHOD

CROSS REFERENCE TO RELATED APPLICATIONS

This application is a Section 371 national phase application based on International Application Number PCT/162016/057921, filed Dec. 22, 2016, which claims the priority of Italian Patent Application No. 102015000088039, filed Dec. 28, 2015; the contents of each application expressly incorporated herein by reference.

The present invention refers to a method for setting up a tyre checking apparatus.

The present invention also refers to a setup device used in said method. A tyre for vehicle wheels generally comprises a carcass structure comprising at least one carcass ply having respectively opposite end edges engaged with respective annular anchoring structures, generally called "bead wires", identified in the areas usually referred to as "beads", having an inner diameter substantially corresponding to a so-called "fitting diameter" of the tyre for fitting it on a respective mounting rim. The tyre also comprises a crown structure comprising a belt structure having at least one belt strip arranged in radially external position with respect to the carcass ply/plies and a radially external tread band with respect to the belt strip(s). Between the tread band and the belt strip(s) a so-called "underlayer" may be interposed, made of elastomeric material of suitable properties to ensure a stable union of the belt strip(s) with the tread band itself. On the side surfaces of the carcass structure, each extending from one of the side edges of the tread band up to the respective annular anchoring structure to the beads, respective sidewalls made of elastomeric material are also applied. In "tubeless" tyres, the carcass ply is internally coated with a layer of elastomeric material, preferably a butyl based one, usually referred to as "liner" having optimal air tightness properties and extending from one bead to another.

The terms "optical", "light" and the like refer to an electromagnetic radiation used that has at least a portion of the spectrum falling around a widened range of the light band, and not necessarily falling strictly within the light band (in other words 400-700 nm), for example such a widened range of the light band can go from ultraviolet to infrared (for example wavelength comprised between about 100 nm and about 1 µm).

The term "robotic member" is meant to indicate a unit comprising a robotic arm. Preferably, said unit comprises a support structure adapted for supporting an acquisition device for acquiring images. Preferably, said unit comprises one or more motors for moving said support structure. More preferably, said unit comprises an electronic unit active on said one or more motors to drive them and obtain movements of said support structure. Preferably, said robotic arm is an anthropomorphic robotic arm. More preferably, said anthropomorphic robotic arm has at least 5 axes/degrees of freedom.

The term "acquisition device" for acquiring images is meant to indicate at least one unit adapted for acquiring a light radiation. Preferably, said unit comprises a support, adapted for allowing the association of this unit and a robotic member. More preferably, said unit comprises at least one emission device adapted for emitting a light radiation, mounted on said support. Even more preferably, said unit is adapted for acquiring the light radiation emitted by the emission device, after such light radiation has interacted (e.g. according to reflection and/or diffusion phenomena) with a tyre to be subjected to checking.

The term "eccentric position" of a setup device with respect to a support base for tyres is meant to indicate a position in which a central axis of said setup device is parallel to and offset with respect to a central axis of said support base.

In processes for producing and building tyres for vehicle wheels it is suitable to perform quality checks on the products made, with the purpose of preventing defective tyres from being able to be put on sale, and/or of progressively adjusting the apparatuses and the machinery used, so as to improve and optimise the performance of the operations carried out in the production process. Such quality checks include for example those carried out by human operators who spend a predetermined time, for example comprised between 30 s and 60 s, for a visual and tactile examination of the tyre; if, in light of his/her experience and capability, the operator suspects that the tyre does not meet certain quality standards, the tyre itself is subjected to further checks, through a more detailed human analysis and/or suitable apparatuses, in order to have a more detailed evaluation of possible structural and/or quality deficiencies.

Document EP 1120640 A1 describes an apparatus for examining the appearance and the shape of a tyre, and in particular to evaluating the quality of an inner surface of the tyre itself: the tyre is positioned on a rotary table. A support structure keeps light emitters and cameras at the centre of the hollow portion of the tyre, so as to detect the characteristics of interest.

Document US 2012/0134656 A1 describes an illumination device and an inspection device for detecting defects in the shape of a tyre.

The Applicant has observed that apparatuses/devices of the type illustrated in EP 1120640 A1 and US 2012/0134656 A1, respectively, are based on the emission and on the detection of electromagnetic radiation, in particular light radiation. In order for the detection to be able to be precise and reliable, the tools used must therefore be suitably set.

The Applicant has also observed that the setting operations (e.g. calibration) of tyre checking apparatuses usually involve a significant amount of time: such operations must be carried out on different tools/devices, and also must be carried out accurately, in order to ensure correct operation of the entire apparatus and thus obtain precise and reliable checks.

The Applicant has thus realised how useful it would be to reduce the time dedicated to the setting operations, while still keeping a high degree of precision and reliability.

The Applicant has observed that the apparatuses/devices of the type illustrated in EP 1120640 A1 and US 2012/0134656 A1 are unable to provide any solution or suggestion in relation to this need. The aforementioned documents, indeed, also do not tackle problems linked to the management of the time taken to carry out the setting operations of the apparatuses used.

The Applicant has subsequently noted that the setting operations of apparatuses for checking vehicles are usually carried out substantially manually by trained workers who, as a function of their own experience and expertise, arrange the various devices in the manner considered most suitable.

The Applicant has verified that settings of this type have at least two orders of problems: firstly, it is difficult for the settings to be precise and repeatable, precisely because they are linked to activities carried out manually; moreover, it often takes a long time since the set-ups are based on "trial-and-error" type logics and/or on iterative progressive refinement processes.

The Applicant has thus perceived that the use of a dedicated device, suitably structured to carry out the setting operations, can allow both the precision of the set-ups and the speed with which they are carried out to be improved.

More specifically, in the Applicant's view, the setup device must, have precise geometric characteristics and a suitable shape, so as to support both the calibration step of an image acquisition device (e.g. a camera) positioned above the tyres and adapted for acquiring images representative of such tyres during the checking steps, and the configuration step of the robotic members adapted for supporting image acquisition devices intended for different checking operations.

The Applicant has thus found that the setting of a tyre checking apparatus can be substantially improved thanks to the use of a setup device having at least one reference to allow a suitable configuration of the robotic members, and a pair of parallel walls, substantially horizontal and having reference shapes, to facilitate the calibration of the image acquisition devices.

In accordance with a first aspect, the invention concerns a method for setting up a tyre checking apparatus.

Preferably, said apparatus comprises at least one support base for a tyre.

Preferably, said apparatus comprises a first acquisition device for acquiring images representative of said tyre positioned on said support base.

Preferably, said apparatus comprises a second acquisition device for acquiring images representative of said tyre positioned on said support base.

Preferably, said apparatus comprises a first robotic member for moving said second acquisition device.

Preferably, a setup device is provided.

Preferably, said setup device comprises a first wall having first predefined shapes.

Preferably, said setup device comprises a second wall having second predefined shapes.

Preferably, provision is made for said second wall to be substantially parallel and non-coplanar to said first wall.

Preferably, said setup device comprises a top surface.

Preferably, said setup device comprises a central reference arranged on said top surface.

Preferably, provision is made to carry out at least one of a first set-up and a second set-up.

Preferably, said first set-up sets the first acquisition device.

Preferably, in order to carry out said first set-up, provision is made to position said setup device on said support base in a first position.

Preferably, in order to carry out said first set-up, provision is made to carry out a first group of movements relative to said setup device.

Preferably, in order to carry out said first set-up, provision is made to carry out a calibration of said first acquisition device as a function of said first predefined shapes and second predefined shapes.

Preferably, said second set-up sets said first robotic member.

Preferably, said first robotic member moves said second acquisition device.

Preferably, in order to carry out said second set-up, provision is made to position said setup device on said support base in a second position.

Preferably, in order to carry out said second set-up, provision is made to carry out a second group of movements relative to said setup device.

Preferably, in order to carry out said second set-up, provision is made to carry out a configuration of said first robotic member as a function of positions taken by said central reference.

The Applicant believes that, in this way, the setting operations, for example comprising the calibration of the aforementioned camera and the configuration of the robotic members can be carried out with speed and precision.

In accordance with a second aspect, the invention concerns a setup device for setting up tyre checking apparatuses.

Preferably, a first wall is provided having first predefined shapes.

Preferably, a second wall is provided having second predefined shapes.

Preferably, said second wall is substantially parallel and non-coplanar to said first wall.

Preferably, a top surface is provided.

Preferably, a central reference is provided arranged on said top surface. The present invention, in at least one of the aforementioned aspects, can include one or more of the preferred features described hereinafter.

Preferably, said calibration comprises acquiring, through said first acquisition device, images representative of said first wall and said second wall, when said first setup device is in different positions.

Preferably, said calibration comprises establishing, as a function of said acquired images, a correspondence between points in the real space and pixels of images acquired by said first acquisition device.

Preferably, said calibration comprises comparing said acquired images with each other.

Preferably, said calibration comprises comparing said acquired images with previously stored references.

Preferably, provision is made for said correspondence to be established as a function of said comparisons.

Preferably, said first position is an eccentric position with respect to a substantially vertical axis of rotation of said support base.

Preferably, said first group of movements comprises rotating said support base about said axis of rotation.

Preferably, acquiring said images comprises acquiring first images of said setup device.

Preferably, each of said first images is representative of said first wall and second wall.

Preferably, each of said first images is acquired when said setup device is in a respective angular position.

Preferably, mutually adjacent angular positions define angles substantially equal to each other.

Preferably, in order to carry out said calibration, provision is made to determine a first centre of rotation about which said first shapes rotate.

Preferably, in order to carry out said calibration, provision is made to determine a second centre of rotation about which said second shapes rotate.

Preferably, in order to carry out said calibration, provision is made to verify whether a straight line passing through said first and second centre of rotation is substantially parallel to a substantially vertical axis of rotation of said support base.

Preferably, said first group of movements comprises translating said setup device with respect to said support base, so that said setup device assumes a further position on said support base.

Preferably, the translation towards said further position is carried out according to a translation direction of tyres on said support base.

Preferably, acquiring said images comprises acquiring at least one second image representative of said setup device in said further position.

Preferably, said configuration comprises acquiring, through said first robotic member, positions of said central reference when said setup device is in positions reached through said second group of movements.

Preferably, said configuration comprises storing the positions acquired.

Preferably, said configuration comprises generating a virtual reference system for said first robotic member as a function of said acquired positions.

Preferably, said second position is a position substantially centred on said support base.

Preferably, provision is made to acquire at least one position of said central reference when said setup device is in said second position.

Preferably, the position of said central reference when said setup device is in said second position defines an origin of the axes for a reference system of said first robotic member.

Preferably, said second group of movements comprises translating said setup device on said support base from said second position to a third position.

Preferably, the translation from the second to the third position is carried out according to a translation direction of tyres on said support base.

Preferably, acquiring the positions of said central reference through said first robotic member comprises acquiring the position of said central reference when said setup device is in said third position.

Preferably, said second group of movements comprises rotating said support base about a substantially vertical axis of rotation, so as to bring said setup device from the third position into a fourth position.

Preferably, acquiring the positions of said central reference through said first robotic member comprises acquiring the position of said central reference when said setup device is in said fourth position.

Preferably, acquiring the position of said central reference comprises bringing a reference spike of said first robotic member into contact with said central reference.

Preferably, acquiring the position of said central reference comprises aligning said spike with said central reference.

Preferably, the central reference of said setup device comprises a pointed protrusion extending from said top surface.

Preferably, the central reference of said setup device comprises a cylinder axially slidable about said protrusion.

Preferably, aligning said spike with said central reference comprises positioning said reference spike so that said cylinder, sliding away from said top surface, becomes at least partially associated with said reference spike.

Preferably, both said first set-up and said second set-up are carried out.

Preferably, said device comprises a substantially cylindrical portion having said top surface.

Preferably, said top surface is defined on said first wall.

Preferably, said first wall and said second wall extend substantially horizontally.

Preferably, said substantially cylindrical portion extends from said second wall.

Preferably, said substantially cylindrical portion and said second predefined shapes are substantially side by side on said second wall.

Preferably, a central axis of said substantially cylindrical portion is spaced apart from a geometric centre of said second wall.

Preferably, said first predefined shapes are substantially the same as said second predefined shapes.

Preferably, the central reference of said setup device comprises an alignment element, having a substantially cylindrical through cavity that is axially slidable about said protrusion.

BRIEF DESCRIPTION OF THE DRAWINGS

Further features and advantages will become clearer from the detailed description of a preferred and not exclusive embodiment of the invention.

Such a description is provided hereinafter with reference to the attached figures, also being given purely as examples and therefore not for limiting purposes, in which.

Figure 1:
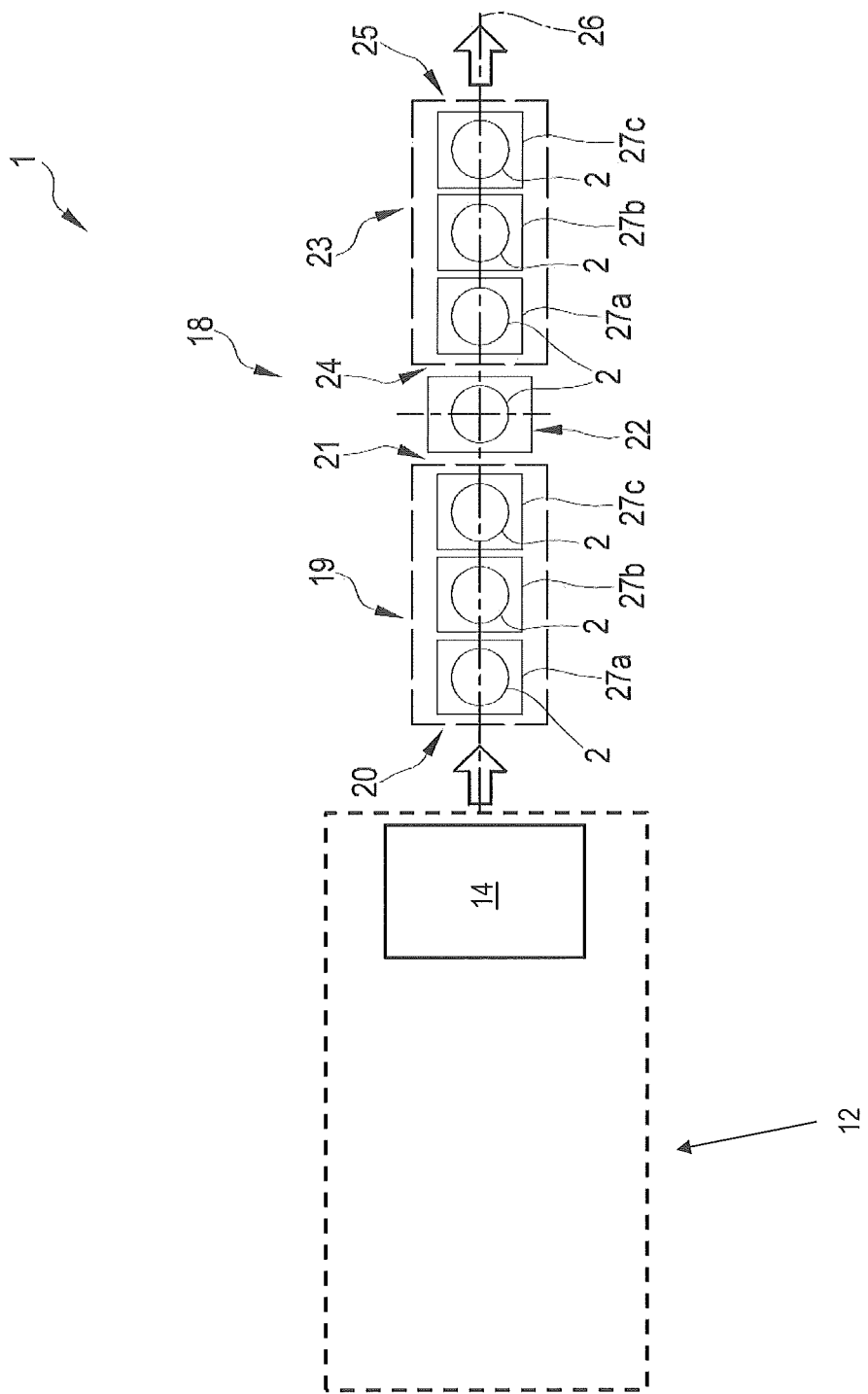
FIGS. 1 and 2 schematically show a tyre checking apparatus in which the present invention can be used.

With reference to the attached figures, reference numeral 1 indicates a tyre checking apparatus in which it is advantageously possible to use the method and the device in accordance with the present invention.

The apparatus 1 can be arranged downstream of a tyre production line, so as to carry out the checking of such tyres after moulding and vulcanisation.

In addition or alternatively, the apparatus 1 can operate at the end of the building and before the moulding and vulcanisation step.

Figure 2:
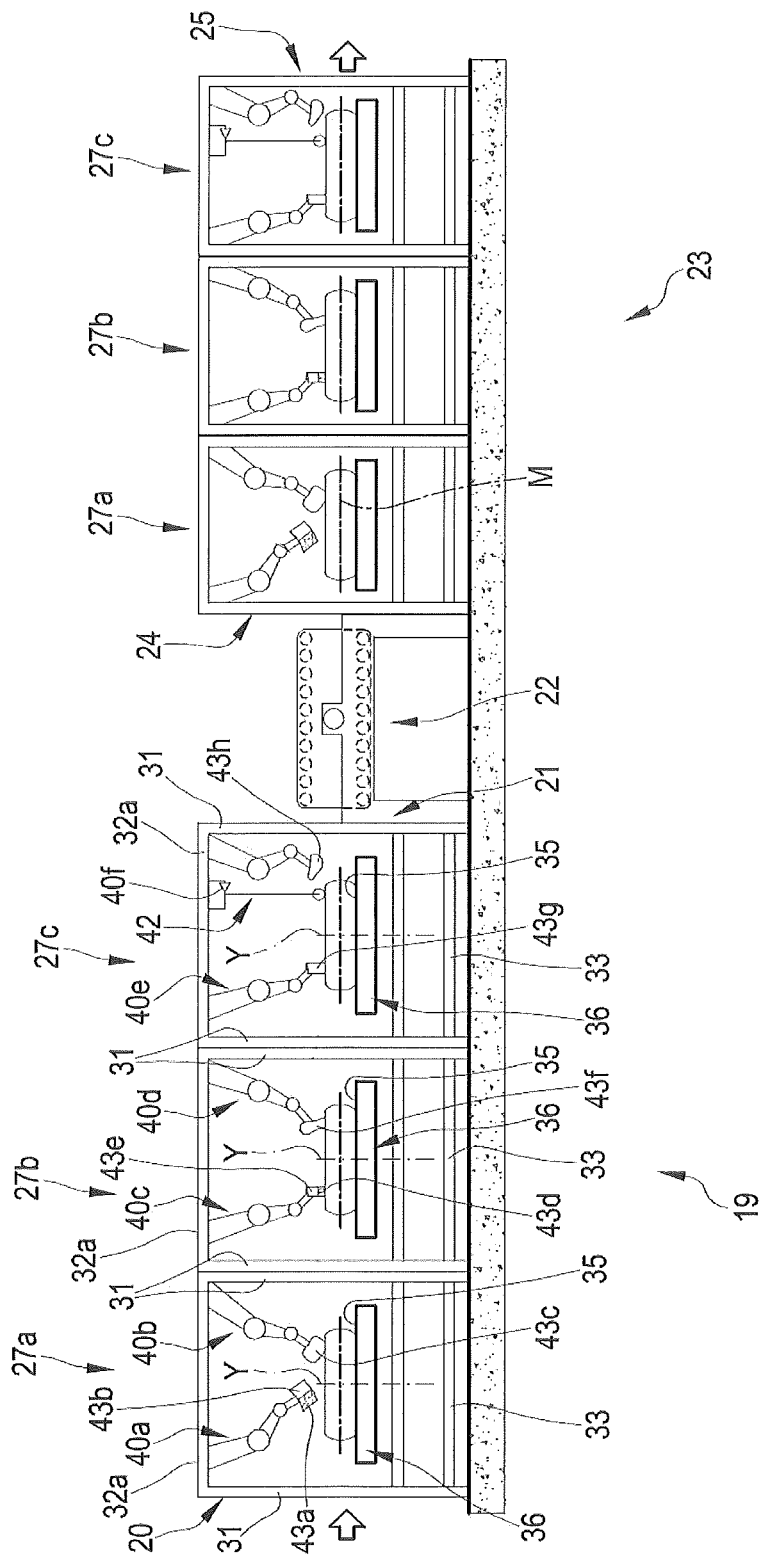

In the embodiments of FIGS. 1 and 2, the tyre checking apparatus 1 arranged downstream of the moulding and vulcanisation unit 14, comprises a first checking unit 19 which has an inlet 20 for the finished tyres 2 to be checked that come from the production line 12 and a respective outlet 21. Downstream of the first checking unit 19, at the outlet 21 of said first checking unit 19, an overturning and transportation device 22 is arranged. Downstream of the overturning and transportation device 22 a second checking unit 23 is positioned, which has an inlet 24 for the finished tyres 2 that come from the overturning and transportation device 22 and a respective outlet 25. The inlet 20 of the first checking unit 19 constitutes the inlet of the apparatus 1 for checking tyres. The outlet 25 of the second checking unit 23 constitutes the outlet of the apparatus 1 for checking tyres. The tyres 2 to be checked enter one after another in sequence into the inlet 20, travel in sequence along a checking path 26 inside the apparatus 1 for checking tyres and come out through the outlet 25. Along the checking path 26, which in the embodiment illustrated in FIGS. 1 and 2 is straight, the tyres 2 are subjected to quality checks in order to verify the possible presence of defects according to ways that will be described hereinafter.

The first checking unit 19 comprises a first checking station 27a, a second checking station 27b and a third checking station 27c arranged in sequence one after another along the checking path 26.

Each of the quoted checking stations 27a, 27b, 27c comprises (FIG. 3 that illustrates the first checking station 27a) a frame 28 having a lower portion 29 configured to be rested on the ground and an upper portion 30 that extends above the lower portion 29. The frame 28 illustrated is a framework formed from four vertical uprights 31 arranged, in plan, at the vertices of a square or of a rectangle. The vertical uprights 31 are connected at the top, at the upper portion 30, by a pair of longitudinal cross members 32a (oriented parallel to the checking path 26) and by a plurality of transversal upper cross members 32b (oriented perpendicular to the checking path 26).

The same vertical uprights 31 are connected at the bottom, at the lower portion 29, by a plurality of longitudinal lower cross members 33a and by a plurality of transversal lower cross members 33b.

The lower cross members 33a, 33b carry a support base 34 preferably defined by a rotary table that has a substantially horizontal resting area 35 configured to receive and support a sidewall of the finished tyre 2 to be checked. Such a resting area 35 can be defined by the upper branch of a conveyor belt, not illustrated in detail in the attached figures. The conveyor belt defines a transferring device 36 of the tyres 2 from one checking station 27a, 27b, 27c to a subsequent checking station 27b, 27c of the same checking unit 19, 23 or to the overturning and transportation device 22.

Figure 3:
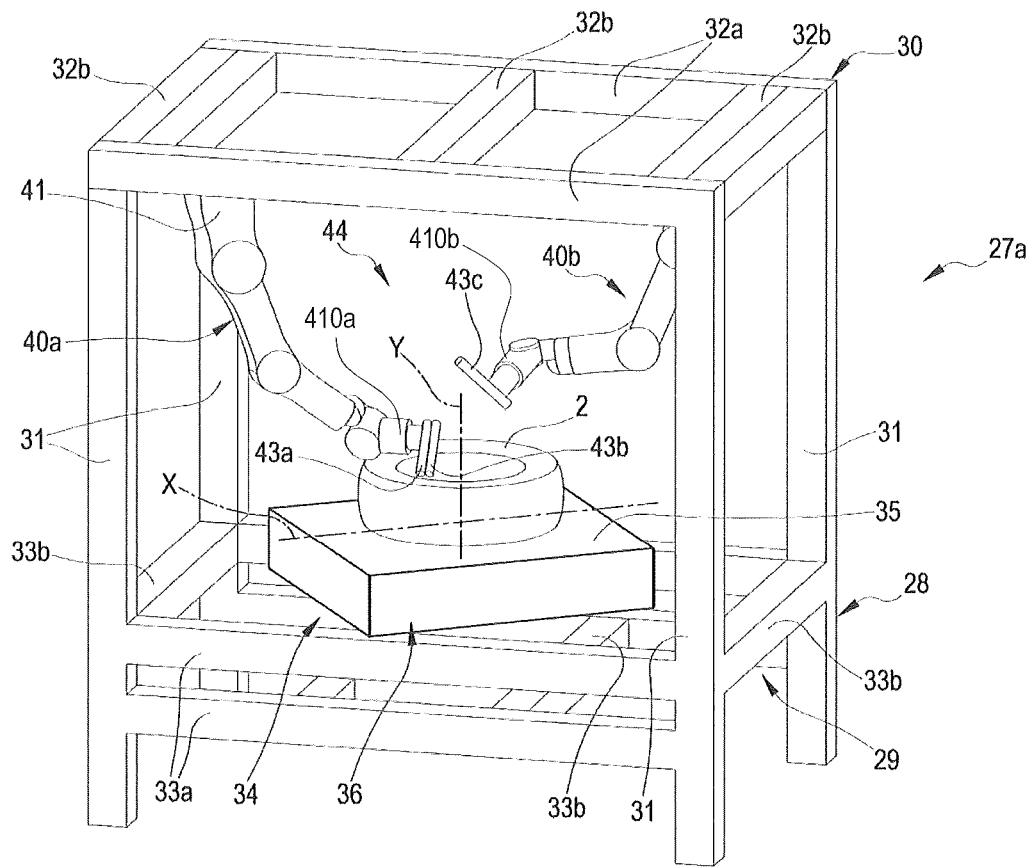
FIG. 3 shows a perspective view of a checking station of the apparatus of FIG. 2.

In greater detail, in the embodiment schematised in FIG. 3, the support base 34 comprises a rotary table hinged to the lower portion 29 about a vertical rotation axis "Y". The rotary table is preferably associated with the conveyor belt that defines a transportation direction "X" during its translation movement.

In a different embodiment, not illustrated, instead of the conveyor belt there can be motorised rollers on which the tyre 2 rests directly.

Figure 3A:
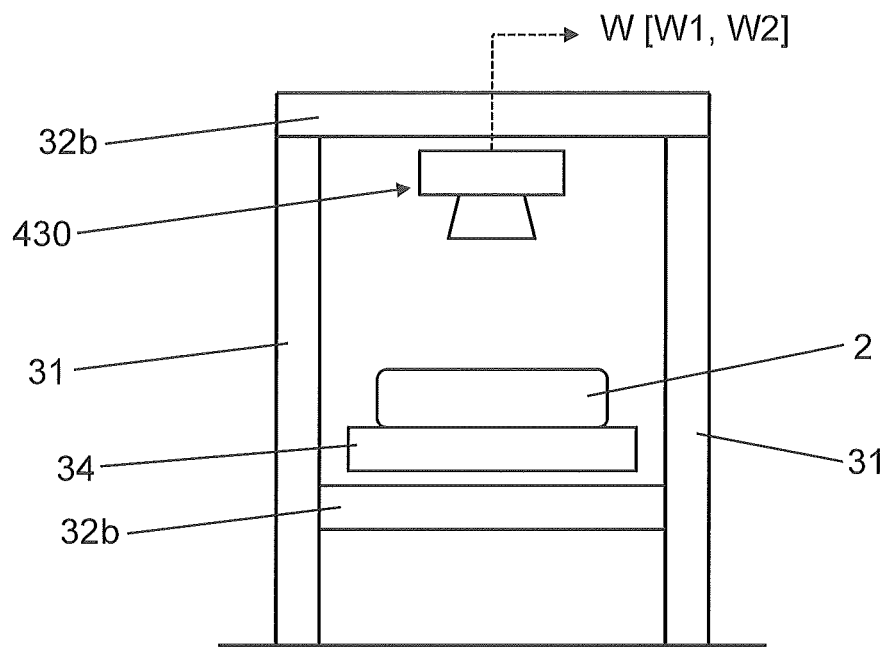
FIG. 3a schematically shows a side view of the checking station of FIG. 3, with some parts eliminated to better highlight others.
Figure 3B:
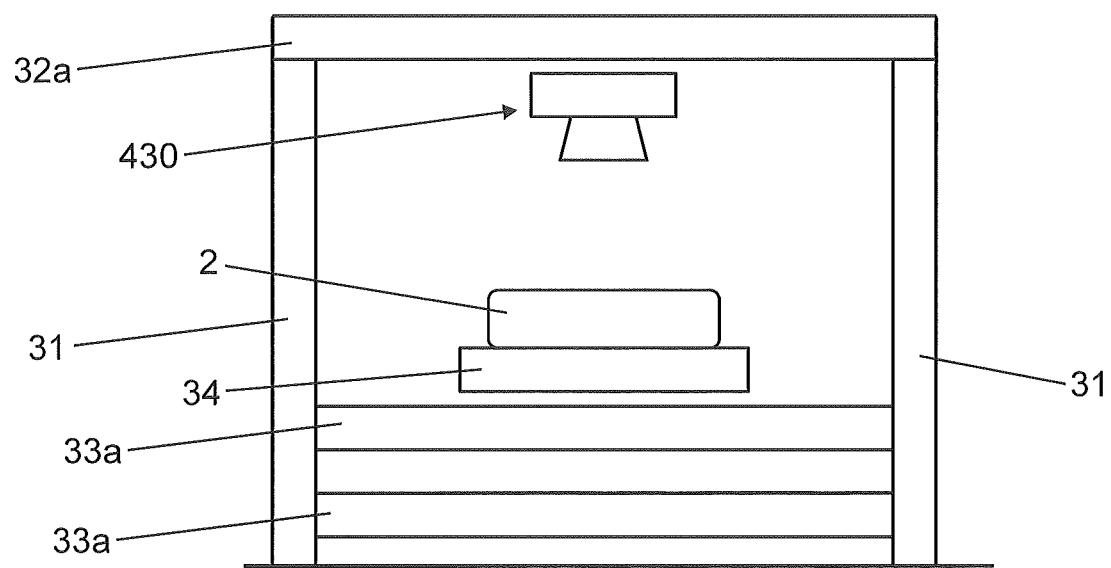
FIG. 3b schematically shows a front view of the checking station of FIG. 3, with some parts eliminated to better highlight others.

Preferably, one or more of the checking stations 27a, 27b, 27c, and more preferably each of the checking stations 27a, 27b, 27c, comprises a first acquisition device 430 (FIGS. 3a, 3b) for acquiring images representative of the tyre 2 positioned on the support base 34.

Preferably, the first acquisition device 430 is used to determine the centring of the tyre 2 inside each of the checking stations 27a, 27b, 27c.

The first acquisition device 430 can, for example, be made like a digital camera.

The first acquisition device 430 is preferably mounted on the frame 28, for example on one of the transversal upper cross members 32b.

In particular, the first acquisition device 430 is mounted above the support base 34.

The first acquisition device 430 is directed downwards, according to a substantially vertical direction, so as to frame at least part of the support base 34 and the tyre 2 rested on it.

The first acquisition device 430 is substantially fixed to, i.e. integral with, the frame 28 itself, apart from the possibility of carrying out fine adjustments on the positioning and/or orientation of the first acquisition device 430 itself.

Preferably, the first acquisition device 430 is not mounted on a robotic member.

Preferably, the apparatus 1 comprises one or more robotic members 40a, 40b, 40c, 40d, 40e, 40f, useful for moving some acquisition devices, which will be described hereinafter.

Preferably, each robotic member is an anthropomorphic robotic arm, even more preferably it is an anthropomorphic robotic arm with at least five axes/degrees of freedom.

For example, each checking station 27a, 27b, 27c, can comprise a pair of robotic members. In particular, the first station 27a can comprise a first robotic member 40a and a second robotic member 40b; the second station 27b can comprise a third robotic member 40c and a fourth robotic member 40d; the third station 27c can comprise a fifth robotic member 40e and a sixth robotic member 40f.

For the sake of simplicity, only the first robotic member 40a and the second robotic member 40b of the first station 27a will be described hereinafter; however, the following description also applies to the robotic members belonging to the second station 27b and the third station 27c.

The first robotic member 40a and the second robotic member 40b are mounted above the support 34 and constrained to the transversal upper cross members 32b. Each of the quoted robotic members 40a, 40b, has its own base portion 41 joined to the transversal upper cross members 32b and a series of segments arranged consecutively, from the base portion 41, and connected by joints.

Each robotic member 40a, 40b extends canti-levered from the transversal upper cross members 32b above the resting area 35. In the illustrated embodiment, the two base portions 41 of the robotic members 40a, 40b are mounted at opposite longitudinal ends of the longitudinal cross members 32a and at opposite edges of the frame 28. Said base portions 41 do not therefore lie directly above the support 34 but are displaced at opposite sides thereof.

An extreme end 410a, 410b of each robotic member 40a, 40b carries one or more acquisition devices 43a, 43b, 43c.

Between the resting area 35 and the quoted transversal upper cross members 32b, the frame 28 delimits a manoeuvring space 44 for the robotic members 40a, 40b, and for the respective acquisition devices. The robotic members 40a, 40b define support and movement devices of the acquisition devices 43a, 43b, 43c.

The first checking station 27a, the second checking station 27b and the third checking station 27c have the same structure described above apart from the type of acquisition devices 43a, 43b, 43c, 43d, 43e, 43f, 43g, 43h carried by the respective robotic members 40a, 40b, 40c, 40d, 40e, 40f.

As an example, the first robotic member 40a of the first checking station 27a carries a second acquisition device 43a, consisting, for example, of a second digital camera. The second acquisition device can be associated with a light source, for example using LEDs, also mounted on the first robotic member 40a and adapted for illuminating the portion of the tyre 2 framed by the second digital camera with diffused light and/or directed substantially like the optical axis of the second camera or with an oblique light and/or directed inclined with respect to the optical axis of said second camera. The same first member 40a also carried a third acquisition device 43b comprising a third camera, preferably associated with a laser light directed inclined with respect to the optical axis of said third camera, so as to be able to highlight particular profiles of the tyre 2, for example on the radially inner portion of the crown structure or on the radially outer portion of the sidewall.

The second robotic member 40b of the first checking station 27a carries a single fourth acquisition device 43c, for example consisting of a fourth digital camera, associated with a light source spaced apart from the fourth camera (for example by means of a suitable frame) and oriented according to an angle preferably comprised between about 60° and about 100°, for example about 90° with respect to the optical axis of said fourth camera, so as to project an oblique light on the tyre 2 capable of highlighting raised defects of the tyre 2 itself, for example protrusions of the cords between the blocks of the tread band. The fourth acquisition device 43c is also preferably associated with a low resolution scanner, also mounted on the second robotic member 40b, so as to be able to scan particular profiles of the tyre 2, for example the radially inner portion of the crown structure.

The third robotic member 40c belonging to the second checking station 27b carries a fifth acquisition device 43d similar or identical to the second acquisition device 43a and comprising a fifth digital camera, associated with a light source adapted for illuminating the portion of the tyre 2 framed by the fifth digital camera with diffused light and/or directed substantially like the optical axis of the fifth camera or with an oblique light and/or directed inclined with respect to the optical axis of said fifth camera. The same third robotic member 40c also carries a sixth acquisition device 43e consisting, for example, of a sixth camera, associated with a laser light directed inclined with respect to the optical axis of said sixth camera so as to be able to highlight particular profiles of the tyre 2, for example the radially outer portion of the tread band or of the bead.

The fourth robotic member 40d belonging to the second checking station 27b carries a single seventh acquisition device 43f comprising a seventh camera, associated with a laser lighted directed inclined with respect to the optical axis of said seventh camera, so as to be able to highlight particular profiles of the tyre 2, for example of the sidewall. The seventh acquisition device 43f is also preferably associated with a mirror, also mounted on the fourth robotic member 40d, which intercepts the optical axis of the seventh camera to frame radially inner portions of the tyre 2 for example corresponding to the sidewall, or relative to the shoulder or to the bead. The aforementioned mirror also intercepts the laser light, projecting it towards the framed field.

The fifth member 40e belonging to the third checking station 27c carries a single eighth acquisition device 43g similar or identical to the second acquisition device 43a and consisting, for example, of an eighth digital camera, associated with a light source adapted for illuminating the portion of the tyre 2 framed by the eighth digital camera with diffused light and/or directed substantially like the optical axis of the eighth camera or with an oblique light and/or directed inclined with respect to the optical axis of said eighth camera.

The sixth robotic member 40f belonging to the third checking station 27c carries a ninth acquisition device 43h similar or identical to the second optical tool 43a and consisting, for example, of a ninth digital camera, associated with a light source adapted for illuminating the portion of the tyre 2 framed by the ninth digital camera with diffused light and/or directed substantially like the optical axis of the ninth camera or with an oblique light and/or directed inclined with respect to the optical axis of said ninth camera. Said ninth acquisition device 43h is also preferably associated with a mirror, also mounted on the sixth robotic member 40f, which intercepts the optical axis of the ninth camera to frame radially inner portions of the tyre 2.

The second checking unit 23 also comprises a first checking station 27a, a second checking station 27b and a third checking station 27c arranged in sequence one after another along the checking path 26. Said checking stations 27a, 27b, 27c of the second checking unit 23 are attributed the same reference numerals as the checking stations 27a, 27b, 27c of the first checking unit 19 because they are substantially identical to said checking stations 27a, 27b, 27c of the first checking unit 19 (including the acquisition devices 43a, 43b, 43c, 43d, 43e, 43f, 43g, 43h and the tools associated with them). Therefore, they will not be described again here in detail.

In general, the first acquisition device 430 and the other acquisition devices 43a, 43b, 43c, 43d, 43e, 43f, 43g, 43h, are used to acquire images representative of the tyre 2 when it is on the support base 34.

In accordance with the invention, a setup device 100 is used to calibrate the first acquisition device 430 and/or to configure one or more of the robotic members 40a, 40b, 40c, 40d, 40e, 40f.

In the following description explicit reference will be made to the configuration of the first robotic member 40a; however, it should be noted that it is possible to carry out a totally analogous configuration, using the setup device 100, also for the remaining robotic members 40b, 40c, 40d, 40e, 40f.

The setup device 100 (FIGS. 5-6) comprises a first wall 110 and a second wall 120.

Preferably, the first and the second wall 110, 120 are substantially parallel and non-coplanar.

In particular, the first and the second wall 110, 120 have substantially horizontal planar extension.

The second wall 120 acts substantially as a base for the entire setup device 100.

Preferably, a substantially cylindrical portion 150 extends from the second wall 120.

Preferably, a central axis H of the substantially cylindrical portion 150 is spaced apart from a geometric centre C of the second wall 120. In practical terms, in a plan view of the setup device 100, the point that represents the central axis H of the substantially cylindrical portion 150 does not coincide with, and therefore is spaced apart from, the point that represents a geometric centre C of the second wall 120.

The cylindrical portion 150 is delimited on top by a top surface 130.

Preferably, the top surface 130 is defined on the first wall 110. In other words, the first wall 110 constitutes the upper portion of the cylindrical portion 150, and the top surface 130 is the surface facing towards the outside (i.e. upwards) of the first wall 110.

On the first wall 110 there are first predefined shapes F1, and on the second wall 120 there are second predefined shapes F2. As will be made clearer hereinafter, the first predefined shapes F1 and the second predefined shapes F2 are used for the calibration of the first acquisition device 430.

Preferably, the first predefined shapes F1 are substantially the same as the second predefined shapes F2.

Figure 5:
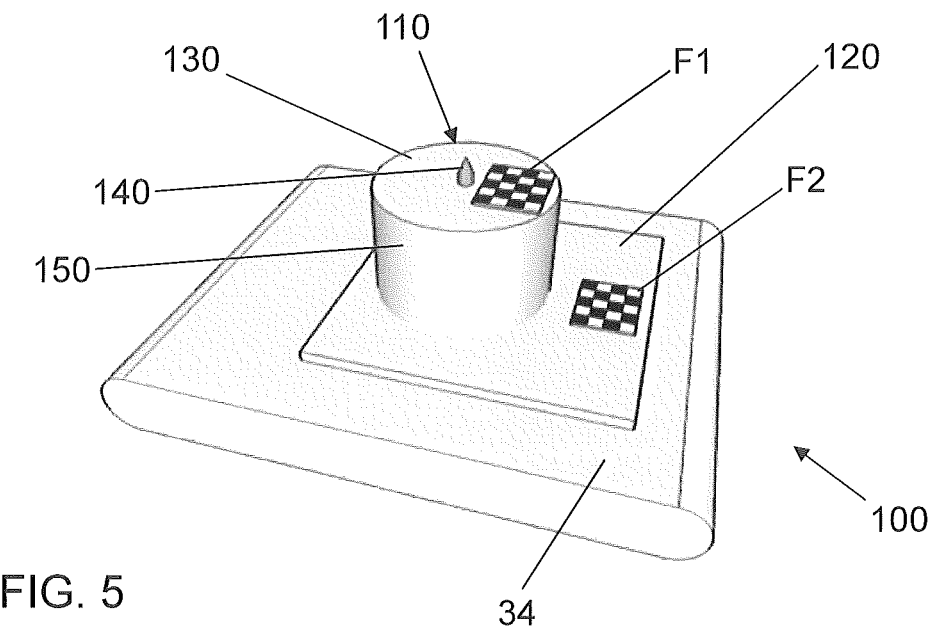
FIG. 5 shows a perspective view of a setup device in accordance with the present invention.
Figure 6:
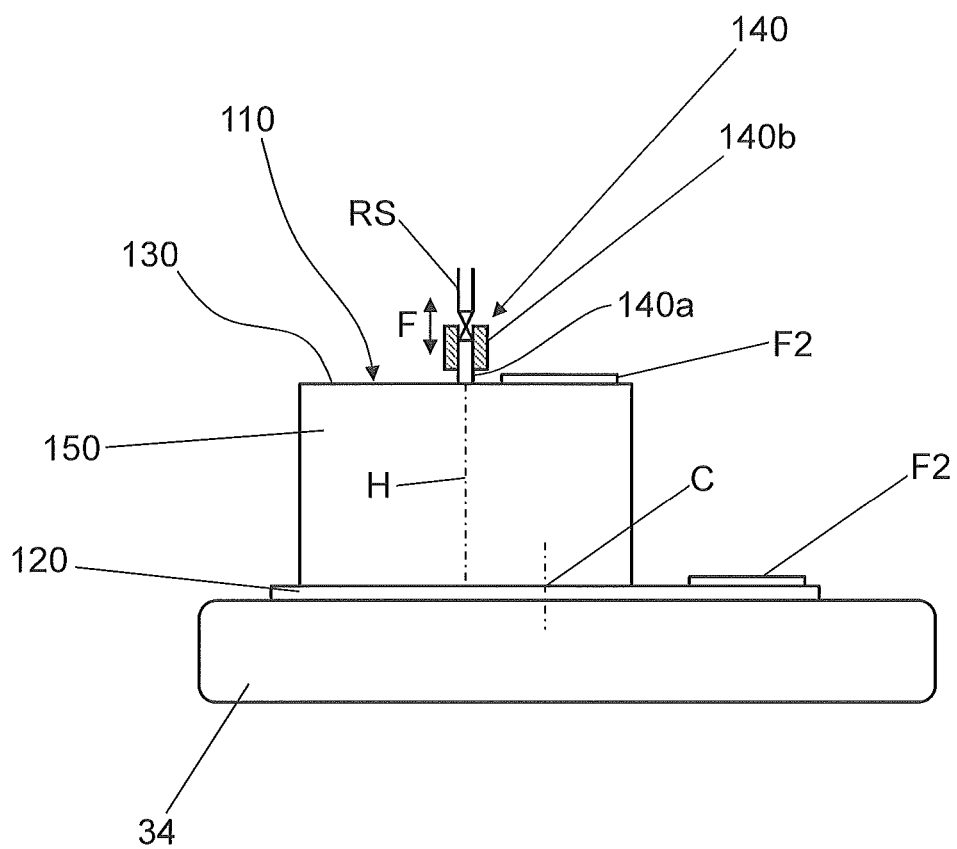
FIG. 6 shows a schematic side view of the device of FIG. 5.

In the embodiment shown in FIG. 5, the first predefined shapes F1 and the second predefined shapes F2 substantially consist of two checkerboards, having alternating light squares and dark squares.

However, it is possible to use different shapes, suitable for the calibration of the first acquisition device 430.

The second predefined shapes F2 are positioned, on the second wall 120, beside the cylindrical portion 150. In other words, in a plan view of the setup device 100, the second predefined shapes F2 face the cylindrical portion 150.

Preferably, on the top surface 130 there is a central reference 140 that, as will become clearer hereinafter, is useful for the configuration of the robotic members 40a, 40b, 40c, 40d, 40e, 40f.

Preferably, the central reference 140 (FIG. 6) comprises a pointed protrusion 140a, which extends from the top surface 130.

Preferably, the central reference 140 also comprises an alignment element 140b, having a substantially cylindrical through cavity and axially slidable about the protrusion 140a. The movement of the alignment element 140b is substantially vertical, away from/towards the top surface 130.

As stated, the setup device 100 is used to calibrate the first acquisition device 430 and/or to configure one or more of the robotic members 40a, 40b, 40c, 40d, 40e, 40f.

In particular, the setup device 100 can be used to carry out a first set-up, in which the first acquisition device 430 is set.

Figure 7A:
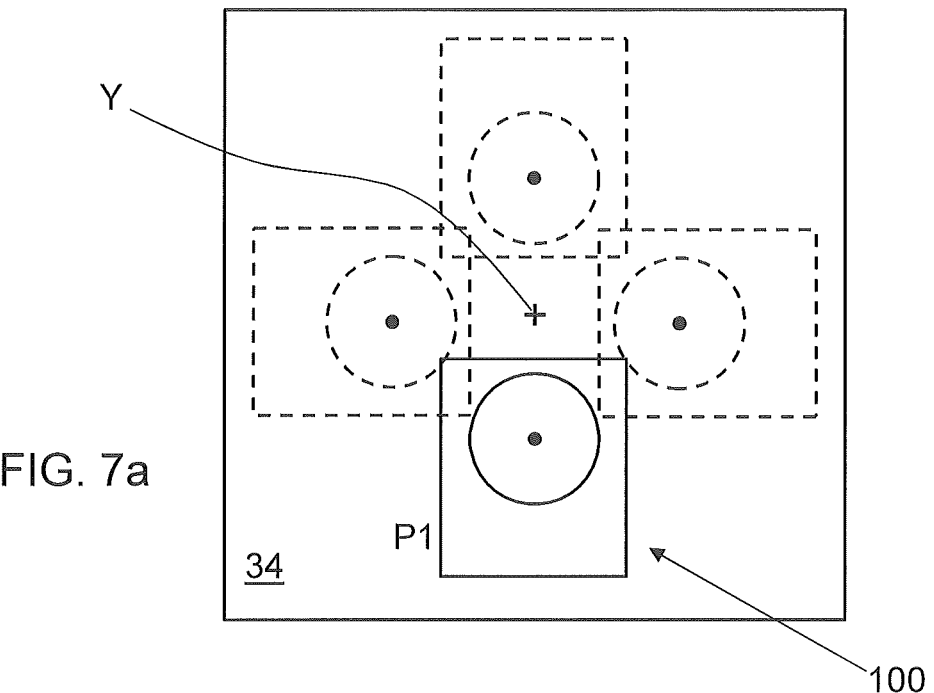
FIGS. 7a-7b and 8a-8c schematically show operative positions of the setup device of FIG. 5.

For this purpose, the setup device 100 is positioned on the support base 34 in a first position P1 (FIG. 7a).

Preferably, the first position P1 is an eccentric position with respect to the substantially vertical axis of rotation Y of the support base 34. In particular, the central axis H of the substantially cylindrical portion 150 is offset with respect to the vertical axis of rotation Y of the support base 34. Purely as an example, the central axis H of the substantially cylindrical portion 150 can be about 20-30 cm away from the vertical axis of rotation Y of the support base 34.

The setup device 100 is rested at the support base 34 through its second wall 120; in particular, the surface of the second wall 120 that is in contact with the support base 34 is opposite the surface, facing upwards, on which the substantially cylindrical portion 150 and the second predefined shapes F2 are located. The first acquisition device 430, therefore, being positioned above the support base 34 and facing downwards, frames the first predefined shapes F1 and the second predefined shapes F2.

A first group of movements relative to the setup device 100 is then carried out and, as a function of the first predefined shapes F1 and the second predefined shapes F2, the calibration of the first acquisition device 430 is carried out.

In greater detail, the first group of movements comprises rotating the support base 34 about its axis of rotation Y. In particular, the setup device 100, which in this circumstance is substantially integral with the support base 34, is brought, with substantial continuity, into a succession of angular positions about the axis of rotation Y of the support base 34. Some angular positions, as an example, are shown with broken lines in FIG. 7a.

Figure 7B:
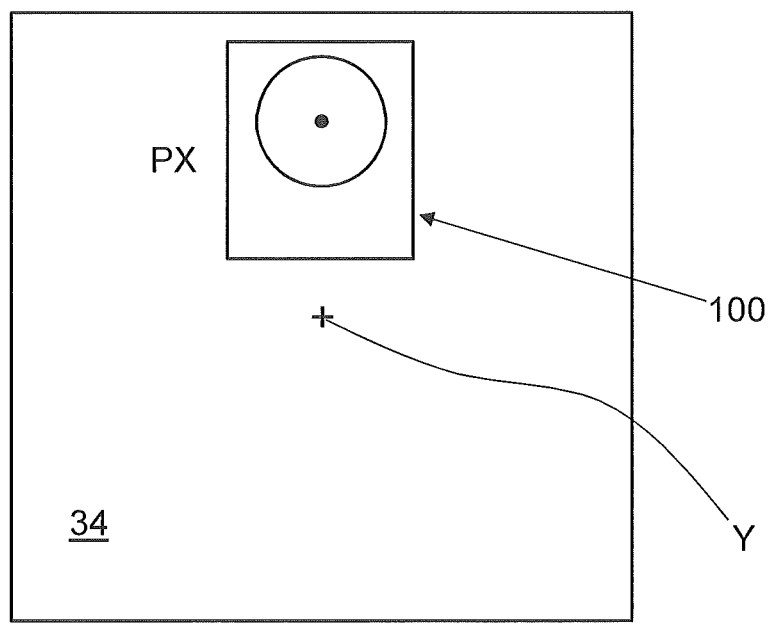

The first group of movements also comprises a translation of the setup device 100 with respect to the support base 34. In this way the setup device 100 assumes a further position PX on the support base 34 (FIG. 7b).

In other words, once the rotation about the axis of rotation Y of the support base 34 has ended, the setup device 100 is brought to a different distance from the axis of rotation Y itself—for example, it is moved further away, still remaining rested at the support base 34, until the further position PX is reached.

Preferably, the translation towards the further position PX is carried out according to a direction along which the tyres 2 are translated on the support base 34 to carry out the checking operations.

While the first group of movements is being carried out, the first acquisition device 430 acquires images W representative of the first wall 110 and of the second wall 120, i.e. of the first predefined shapes F1 and of the second predefined shapes F2, when the setup device 100 is in different positions.

Preferably, the images W comprise first images W1, each representative of the first wall 110 and of the second wall 120; each of the first images W1 is acquired when the setup device 100 is in a respective angular position. Preferably, mutually adjacent angular positions defined angles substantially equal to each other. Purely as an example, twelve first images W1 can be acquired, one for every 30° of rotation. FIG. 7a shows only some of these angular positions.

Preferably, the images W comprise a second image W2, representative of the setup device 100 when the latter is in the further position PX.

As a function of the detection of the images W, and in particular as a function of the first predefined shapes F1 and of the second predefined shapes F2, a calibration of the first acquisition device 430 is carried out.

In particular a correspondence is established between points in the real space and pixels of images acquired by the first acquisition device 430, as a function of the images W acquired. In this way, during the checking operations, when the tyres 2 are framed by the first acquisition device 430, the images acquired can be correctly interpreted, to the benefit of the precision and reliability of the checks carried out.

Preferably, the acquired images W are compared with each other and/or with previously stored references, so as to establish the aforementioned correspondence.

Preferably, in order to carry out the calibration of the first acquisition device 430, a first centre of rotation about which the first predefined shapes F1 rotate is determined, and a second centre of rotation about which the second predefined shapes F2 rotate is also determined. The first and the second centre of rotation are determined as a function of the first images W1, i.e. the images acquired by the first acquisition device 430 while the setup device 100 is rotated around the axis of rotation Y of the support base 34.

Thus, it is verified whether the straight line passing through the first and the second centre of rotation is substantially vertical, i.e. substantially parallel to the axis of rotation Y of the support base 34. In practice, it is verified whether the two centres of rotation substantially overlap in a view from above acquired by the first acquisition device 430.

In the affirmative case, the first acquisition device 430 can be considered correctly aligned with respect to the axis of rotation Y of the support base 34; otherwise, a correction of the optical/mechanical setting of the first acquisition device 430 is carried out.

If the two centres of rotation are correctly aligned, it is possible to consider the position and the inclination of the axis of rotation Y of the support base 34 to be known.

By detecting the second image W2, it is possible to complete the mapping of the real space and define a complete three-dimensional reference system for the first acquisition device 430, so as to create the aforementioned correspondence between points in real space and pixels of the images acquired by the first acquisition device 430 itself.

The setup device 100 can also be used to carry out a second set-up.

The second set-up sets the first robotic member 40a, which moves the second acquisition device 43a.

Figure 8A:
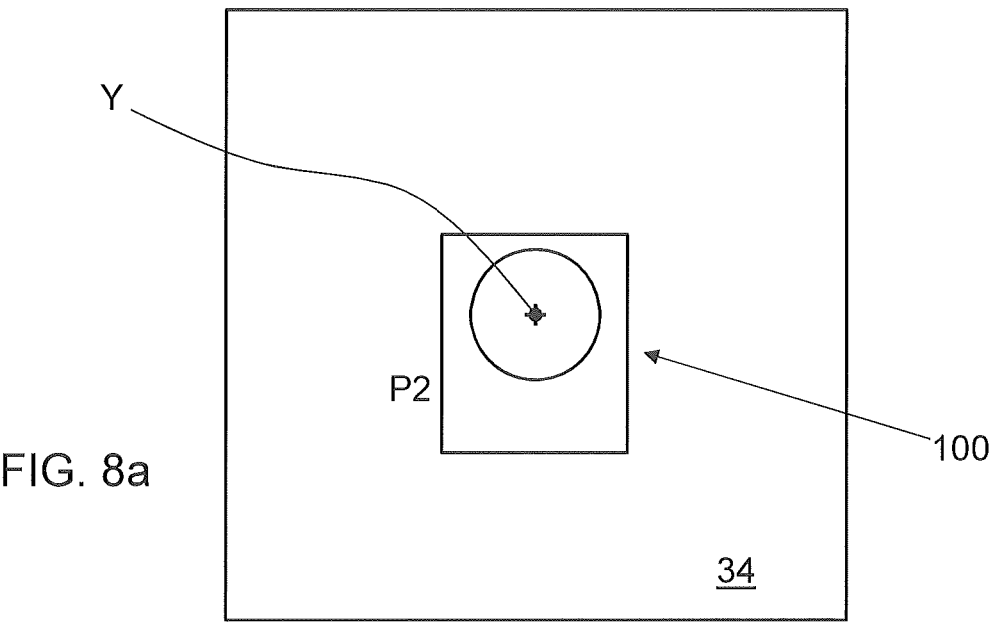

Firstly, the setup device 100 is positioned on the support base 34 in a second position P2 (FIG. 8a).

Preferably, the second position P2 is a position substantially centred on the support base 34.

Preferably, when the setup device 100 is in the second position P2, the central axis H of the substantially cylindrical portion 150 substantially coincides with the axis of rotation Y of the support base 34.

A second group of movements relative to the setup device 100 is then carried out.

Figure 8B:
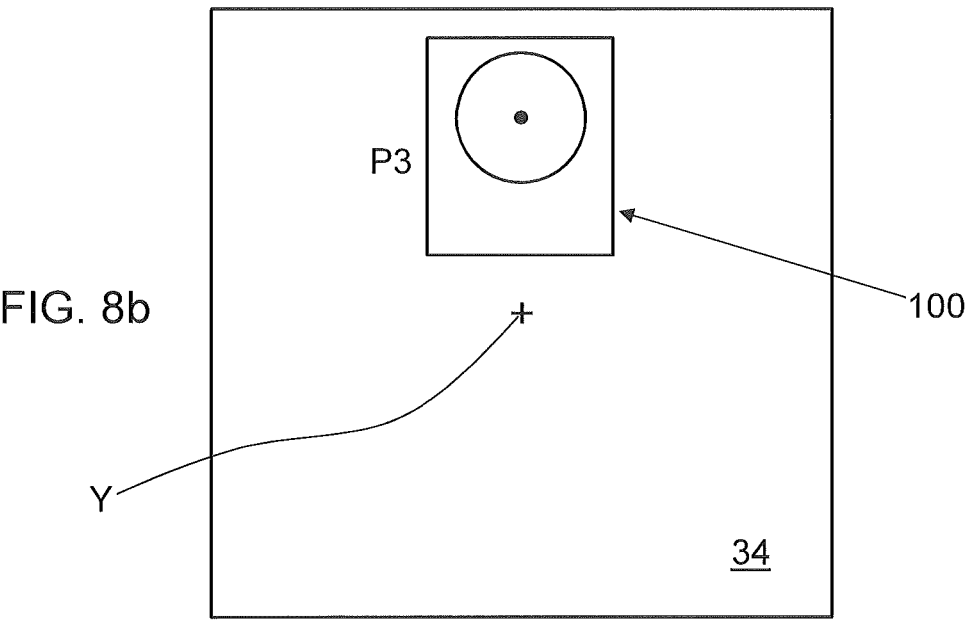

Preferably, the second group of movements comprises a translation of the setup device 100 on said support base 34, from the second position P2 to a third position P3 (FIG. 8b).

Preferably, the translation from the second position P2 to the third position P3 is carried out in a direction according to which the tyres 2 are translated on the support base 34 to carry out the checking operations.

Figure 8C:
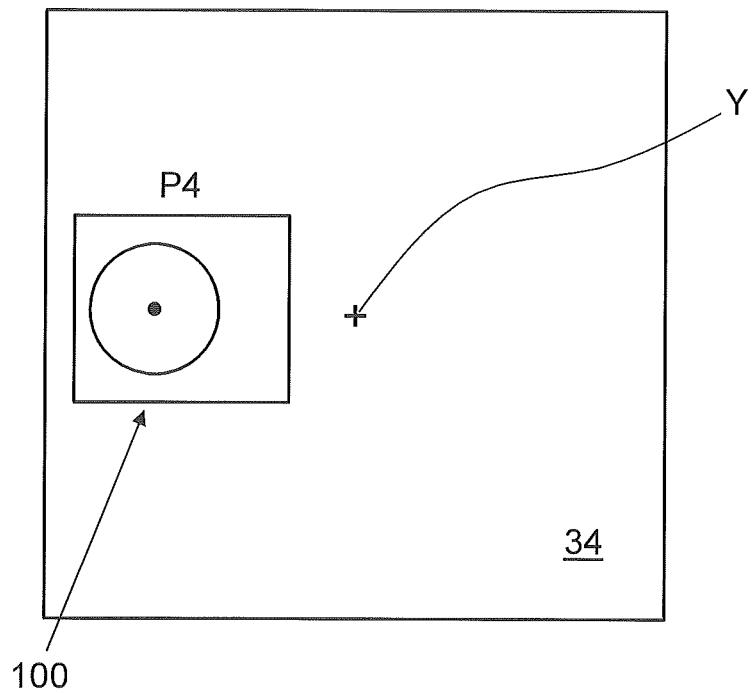

Preferably, the second group of movements also comprises a rotation of the support base 34 about its substantially vertical axis of rotation Y; in this way the setup device 100 is brought from the third position P3 into a fourth position P4 (FIG. 8c).

The rotation of the support base 34 that brings the setup device from the third position P3 to the fourth position P4 is preferably less than 360° and, for example, comprised between about 45° and about 135°.

It should be noted that in FIGS. 7a-7b, 8a, 8b, 8c, the proportions between the setup device 100 and the support base 34 have been deliberately modified, reducing the relative dimensions of the setup device 100, for the sole purpose of better highlighting and representing the positions taken up by the setup device 100 itself.

As a function of the positions taken up by the central reference 140 during the aforementioned second group of movements, the configuration of the first robotic member 40a is carried out.

In particular, through the first robotic member 40a positions of the central reference 140 are acquired; such positions are stored and, as a function of the positions acquired, a virtual reference system for the first robotic member 40a is generated.

Preferably, at least one position of the central reference 140 is acquired through the first robotic member 40a when the setup device 100 is in the second position P2.

Preferably, the position of the central reference 140 is acquired through the first robotic member 40a when the setup device 100 is in the third position P3.

Preferably, the position of the central reference 140 is acquired through the first robotic member 40a when the setup device 100 is in the fourth position P4.

Preferably, in order to detect the position of the central reference 140 through the first robotic member 40a, the follow is carried out.

Firstly, the first robotic member 40a is provided with a reference spike RS.

The reference spike RS is mounted on the free end 410a of the first robotic member 40a, where the second acquisition device 43a is also mounted.

Figure 4:
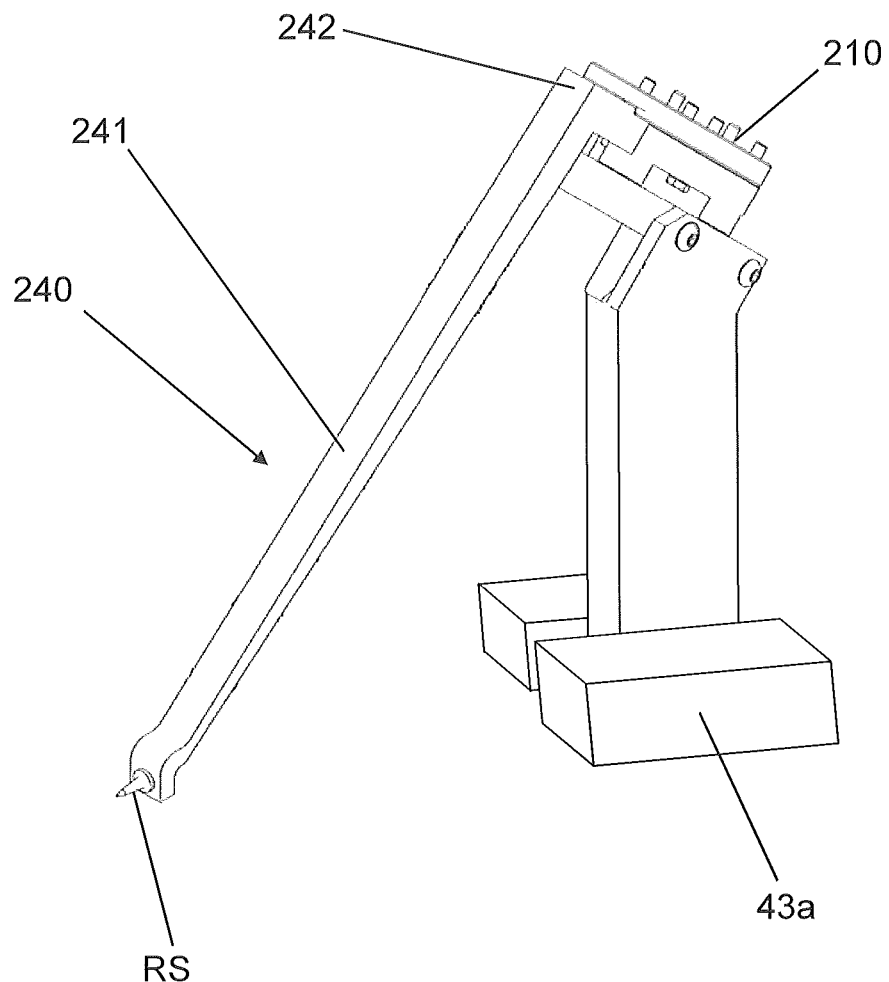
FIG. 4 shows a device belonging to the checking station of FIG. 3.

The reference spike RS can advantageously be part of a mechanical element 240, schematically shown in FIG. 4, which is mounted on the first robotic member 40a together with the second acquisition device 43a.

Preferably, the mechanical element 240 can comprise a shaped rod 241, at a front end of which the aforementioned reference spike RS is provided. Preferably, the mechanical element 240 also comprises, at an opposite end to said reference spike RS, a fixing portion 242, which allows the mechanical element 240 itself to be fixed to a support 210, used to also mount the second acquisition device 43a, and the various tools associated with it, on the first robotic member 40a.

The reference spike RS of the first robotic member 40a is brought into contact with the central reference 140.

The reference spike RS is thus aligned with the central reference 140. Preferably, in order to align the reference spike RS with the central reference 140, the reference spike RS is positioned so that the alignment element 140b of the reference 140, sliding away from the top surface 130, becomes at least partially associated with the reference spike RS.

In other words, if the reference spike RS is aligned with the central reference 140, and in particular with the pointed protrusion 140a, the alignment element 140b can slide along the pointed protrusion 140a and, without solution of continuity, be fitted around the reference spike RS of the first robotic member 40a.

Once the reference spike RS is correctly positioned and oriented, data representative of the position assumed, in that situation, by the first robotic member 40a, is stored. Such data is also representative of the corresponding position of the central reference 140.

As stated, the position of the central reference 140 is preferably detected when the setup device 100 is in the second position P2, in the third position P3 and in the fourth position P4.

This data is sufficient to generate, in a per se known way, a three-dimensional virtual reference system for the first robotic member 40a.

Such a reference system will then be used to move in space the second and/or the third acquisition device 43a, 43b, mounted on the first robotic member 40a, during the checking operations of the tyres 2.

Advantageously, the origin of the axes of said reference system is defined by the position of the central reference 140 when the setup device 100 is in the second position P2.

It should be noted that, in an embodiment, at least one of the aforementioned first set-up (i.e. the setting of the first acquisition device 430) and second set-up (i.e. the setting of the first robotic member 40a) is carried out.

Preferably, both said first set-up and second set-up are carried out.

The invention claimed is:

1. A method for setting up a tyre checking apparatus, the apparatus comprising a support base for supporting a tyre, a first acquisition device and a second acquisition device for acquiring images of the tyre positioned on the support base and a first robotic member for moving the second acquisition device;

wherein the method comprises:
providing a setup device comprising:
a first wall having first predefined shapes;
a second wall having second predefined shapes, wherein the second wall is substantially parallel and non-coplanar to the first wall;
a top surface of the device; and
a central reference arranged on the top surface; and
executing at least one of a first set-up and a second set-up, wherein the first set-up sets up the first acquisition device, and comprises:
positioning the setup device on the support base of the apparatus in a first position;

carrying out a first group of movements relative to the setup device; and calibrating the first acquisition device based on the first predefined shapes and the second predefined shapes;

wherein the second set-up sets up the first robotic member to move the second acquisition device, and comprises:

positioning the setup device on the support base of the apparatus in a second position;

carrying out a second group of movements relative to the setup device; and configuring the first robotic member based on positions of the central reference.

2. The method according to claim 1, wherein calibrating the first acquisition device comprises:

acquiring, through the first acquisition device, one or more images of the first wall and the second wall when the setup device is in different positions; and establishing, based on the one or more acquired images, a correspondence between points in the real space and pixels of images acquired by the first acquisition device.

3. The method according to claim 2, wherein calibrating the first acquisition device further comprises comparing the one or more images with one another or with previously stored references, wherein the correspondence is established based on the comparisons.

4. The method according to claim 3, wherein:

the first position is eccentric relative to a substantially vertical axis of rotation of the support base;

the first group of movements comprises rotating the support base about the axis of rotation; and acquiring the one or more images comprises acquiring first images of the setup device, wherein each of the first images is each one representative of the first wall and second wall, and is acquired when the setup device is in a respective angular position.

5. The method according to claim 4, wherein:

the first group of movements comprises translating the setup device relative to the support base of the apparatus in order for the setup device to take a further position on the support base; and acquiring the images comprises acquiring one ore more second images of the setup device in the further position.

6. The method according to claim 5, wherein a first set-up and a second set-up are both carried out.

7. The method according to claim 1, wherein configuring the first robotic member comprises:

acquiring, through the first robotic member, one or more positions of the central reference when the setup device is positioned by the second group of movements;

storing the one or more positions; and generating a virtual reference system for the first robotic member based on the one or more positions.

8. The method according to claim 7, wherein:

the second position is substantially centered on the support base of the apparatus; and the position of the central reference is acquired when the setup device is in the second position.

9. The method according to claim 8, wherein the second group of movements comprises:

translating the setup device on the support base of the apparatus from the second position to a third position; and acquiring the positions of the central reference through the first robotic member when the setup device is in the third position.

10. The method according to claim 9, wherein the second group of movements further comprises:

rotating the support base of the apparatus about a substantially vertical axis of rotation, in order to move the setup device from the third position to a fourth position; and acquiring the positions of the central reference through the first robotic member when the setup device is in the fourth position.

11. The method according to claim 10, wherein acquiring the one or more positions of the central reference comprises:

bringing a reference spike of the first robotic member in contact with the central reference; and aligning the reference spike with the central reference.

12. The method according to claim 11, wherein the central reference of the setup device comprises:

a pointed protrusion extending from the top surface; and a cylinder axially slidable around the protrusion.

13. The method according to claim 12, wherein aligning the reference spike with the central reference comprises:

positioning the reference spike to the cylinder, wherein as the cylinder slides away from the top surface, the cylinder is at least partially associated with the reference spike.

14. The method according to claim 13, wherein a first set-up and a second set-up are both carried out.

15. The method according to claim 1, wherein a first set-up and a second set-up are both carried out.

* * * * *